United States Patent
Daniels et al.

(10) Patent No.: US 9,779,092 B2
(45) Date of Patent: Oct. 3, 2017

(54) MAINTAINING CONSISTENCY BETWEEN A DATA OBJECT AND REFERENCES TO THE OBJECT WITHIN A FILE

(75) Inventors: Nigel Daniels, Winchester (GB); Doina L. Klinger, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1506 days.

(21) Appl. No.: 12/944,105

(22) Filed: Nov. 11, 2010

(65) Prior Publication Data

US 2011/0225126 A1    Sep. 15, 2011

(30) Foreign Application Priority Data

Mar. 11, 2010  (EP) ................... 10156236.1

(51) Int. Cl.
  *G06F 17/30* (2006.01)
(52) U.S. Cl.
  CPC ............... *G06F 17/30014* (2013.01)
(58) Field of Classification Search
  CPC ................................. G06F 17/30014
  See application file for complete search history.

(56) References Cited

U.S. PATENT DOCUMENTS

| | | | |
|---|---|---|---|
| 6,330,685 B1 | 12/2001 | Hao et al. | |
| 6,970,981 B2 * | 11/2005 | Kanaley | 711/141 |
| 8,001,136 B1 * | 8/2011 | Papachristou et al. | 707/758 |
| 2005/0028080 A1 | 2/2005 | Challenger et al. | |
| 2005/0187983 A1 * | 8/2005 | Narang et al. | 707/200 |
| 2007/0061751 A1 | 3/2007 | Cory et al. | |
| 2007/0214189 A1 | 9/2007 | Groble | |
| 2009/0019059 A1 * | 1/2009 | Ricart et al. | 707/10 |
| 2009/0019064 A1 | 1/2009 | Takafuji | |
| 2010/0049668 A1 * | 2/2010 | Lynn et al. | 705/36 R |

OTHER PUBLICATIONS

Craig E. Wills, Mikhail Mikhailov, and Hao Shang. 2001. N For the price of 1: bundling web objects for more efficient content delivery. In Proceedings of the 10th international conference on World Wide Web (WWW '01). ACM, New York, NY, USA, 257-265.*
Dummies.com. 2009. Crystal Reports 10: Understanding Object Linking and Embedding (OLE). http://web.archive.org/web/20090225064152/http://dummies.com/how-to/content/crystal-reports-10-understanding-object-linking-an.html.*

* cited by examiner

*Primary Examiner* — Syed Hasan
(74) *Attorney, Agent, or Firm* — Yee & Associates, P.C.; Stephen R. Yoder

(57) ABSTRACT

A technique for maintaining consistency between a data object and references to the object in a file. An indication that a source object has changed is received. One or more of the changes made to the source object are identified. A file comprising one or more references related to the source object is analyzed to identify those references that may be inconsistent with the changes made to the source object.

10 Claims, 3 Drawing Sheets

MAINTAINING CONSISTENCY BETWEEN A DATA OBJECT AND REFERENCES TO THE OBJECT WITHIN A FILE

BACKGROUND

1. Field

The present invention relates to a method, apparatus or software for maintaining consistency between a data object and references to the object within a file.

2. Description of the Related Art

Data files in computer systems, such as document or program files, commonly comprise semantic dependencies between elements or objects within the data. For example, in a document file a data object, such as a chart, graph, spreadsheet or picture, within the document may be referenced in other parts of the data file. In another example, in a program file an object such as a program routine may be called or referenced by other elements in the program. Furthermore, the text surrounding a data object may contain comments, descriptions or evaluations referring to the content of a referenced object. If the object changes, for example by being modified or replaced, the references to that object or its contents may become inconsistent. In other words, information associated with the changed object may no longer be correct. Identifying the relevant references and information associated with a given object that has changed is a time consuming and error prone process.

SUMMARY

According to a first aspect of the invention, there is provided a method for maintaining consistency between a data object and references related to the object in a file, the method comprising the steps of: receiving an indication that a source object has changed; identifying one or more of the changes made to the source object; and analyzing a file comprising one or more references related to the source object to identify those of the references that may be inconsistent with the changes made to the source object.

The method preferably further comprises the steps of: comparing a first set of metadata associated with the source object, prior to the change, with a second set of metadata associated with the source object post change; responsive to determining one or more differences between the first and second sets of metadata, searching the file for one or more occurrences of each first metadata element that differs from the second set of metadata; and identifying any matches to the or each first metadata element in the file, the matches comprising the references that may be inconsistent with the changes made to the source object.

The file preferably comprises an instance of the source object. The method preferably further comprises the steps of: defining a scope for the identification of the references that may be inconsistent with the changes made to the source object, the scope being defined relative to the instance of the source object; and limiting the identification of the references to references located within the scope.

One or more of the identified references that may be inconsistent with the changes made to the source object may be notified to a user. One or more of the matches comprising the references that may be inconsistent with the changes made to the source object may be corrected automatically in dependence on the corresponding second metadata element. The first and second sets of metadata may be compared in response to the detection of a change in the monitored source object. The metadata may be generated in dependence on the type of the object. The matches may comprise references that are synonyms of one of the differing first metadata elements. The file may comprise the source object.

According to a second aspect of the invention, there is provided an apparatus for maintaining consistency between a data object and references related to the object in a file, the apparatus being operable to: receive an indication that a source object has changed; identify one or more of the changes made to the source object; and analyze a file comprising one or more references related to the source object to identify those of the references that may be inconsistent with the changes made to the source object.

According to a third aspect of the invention, there is provided a computer program comprising program code means adapted to perform, when the program is run on a computer, a method for maintaining consistency between a data object and references related to the object in a file, the method comprising the steps of: receiving an indication that a source object has changed; identifying one or more of the changes made to the source object; and analyzing a file comprising one or more references related to the source object to identify those of the references that may be inconsistent with the changes made to the source object.

According to a fourth aspect of the invention, there is provided a computer program comprising program code means adapted to provide, when the program is run on a computer, apparatus for maintaining consistency between a data object and references related to the object in a file, the apparatus being operable to: receive an indication that a source object has changed; identify one or more of the changes made to the source object; and analyze a file comprising one or more references related to the source object to identify those of the references that may be inconsistent with the changes made to the source object.

BRIEF DESCRIPTION OF THE SEVERAL VIEWS OF THE DRAWINGS

Embodiments of the invention will now be described, by way of example only, with reference to the accompanying drawings in which.

DETAILED DESCRIPTION

Figure 1:
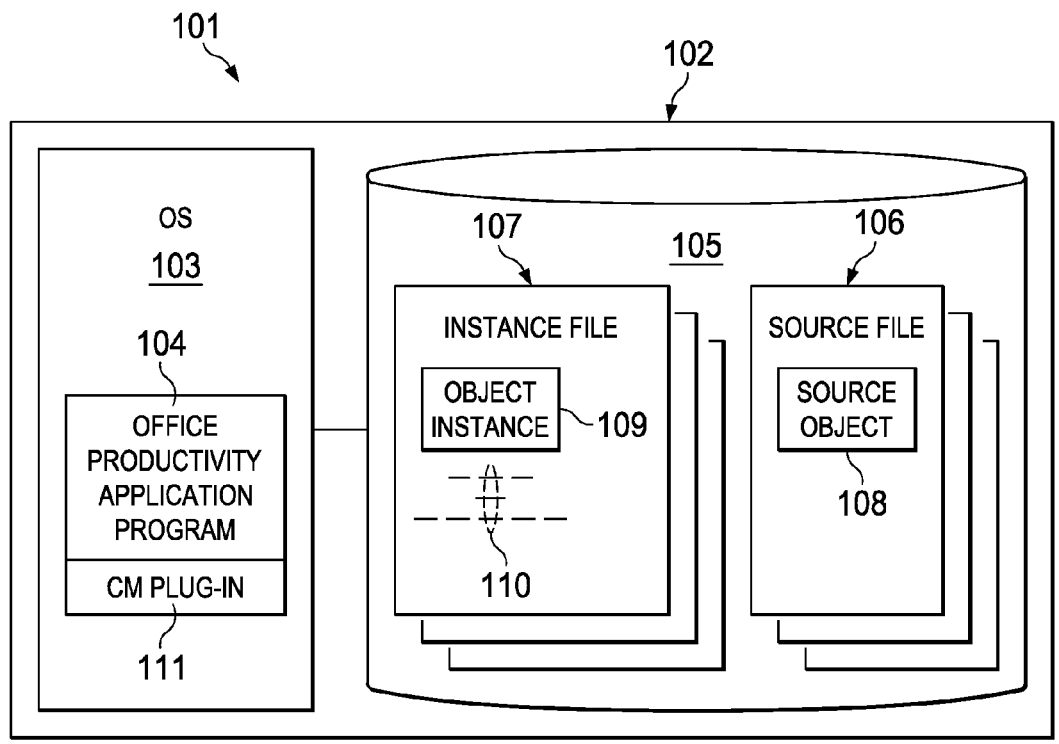
FIG. 1 is a schematic illustration in accordance with an embodiment of the invention of a computer system comprising an office productivity suite of application programs.

With reference to FIG. 1, a computer system 101 comprises a computer 102 arranged to run an operating system (OS) 103. The OS 103 provides a platform or processing environment for an application program in the form of an office productivity application program (OPAP) 104 comprising a spreadsheet, word-processing, presentation and charting suite of application programs. The computer 102 comprises a storage device 105 for storing data produced or utilized by the OPAP 104 in the form of one or more source files 106 and instance files 107. The source files 106 comprise one or more data objects in the form of source objects 108. The instance files 107 comprise an instance object 109 that is a copy or an instance of the corresponding source object 108. The instance object 109 has been linked, copied or embedded into the instance file 107 from the corresponding source file 106. For example, the instance object 109 may be a spreadsheet excerpt or graph copied into a word-processing document. In this case, the instance file 107 is a word processing document and the source file 106 is a spreadsheet document. Each of the instance files 107 further comprise one or more associated data elements 110 that are associated to the object instance 109. The associated data elements 110 comprise references to the object instance 109, its contents or other semantic links or associations.

In the present embodiment, a consistency manager (CM) plug-in program 111 is provided for providing additional functionality to the OPAP 104. The CM 111 is arranged to monitor the source objects 108 for given object instances 109 for any changes. If such changes are detected, the references 110 in each instance file 107 comprising a corresponding object instance 109 are checked to determine whether they have become inconsistent with the modified object instance 109. If one or more references 110 have become inconsistent, then each such inconsistency is automatically corrected or highlighted to a user for correction approval or manual correction.

Figure 2:
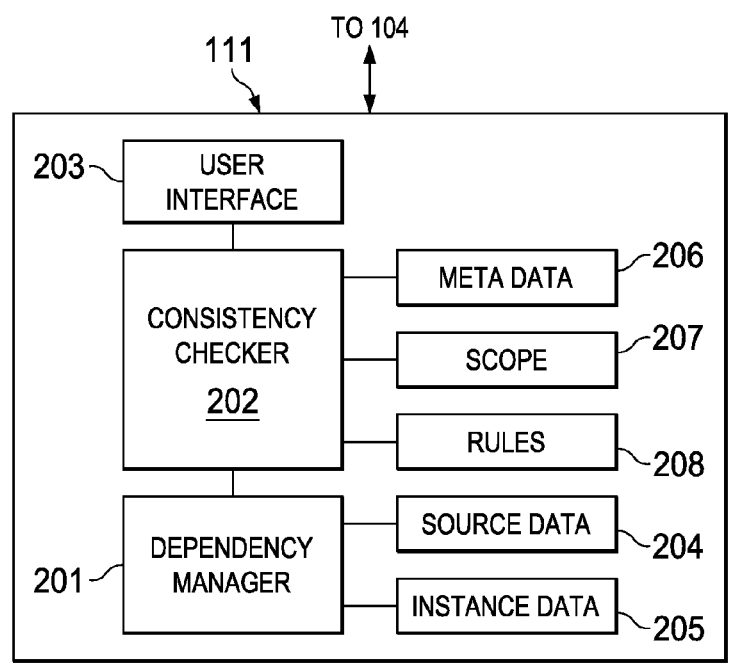
FIG. 2 is a schematic illustration in accordance with an embodiment of the invention of a plug-in program of the office productivity suite of FIG. 1.

With reference to FIG. 2, in the present embodiment, the CM 111 comprises a dependency manager module 201, a consistency checker module 202 and a user interface 203. The dependency manager 201 is arranged to respond to the insertion of an object into an instance file 107 and, in response, operable to store source data 204 identifying the source file 106 for the corresponding source object and instance data 205 identifying the instance file 107 into which the object instance 109 has been inserted, embedded, copied, transferred or otherwise linked. In the present embodiment, the dependency manager 201 is arranged to either automatically detect inserted objects for a given file or to respond to user indication via the user interface 203 that an identified object should be monitored for changes as described herein.

The consistency checker 202 is arranged to monitor the relevant source objects 108 for modifications. In response to such changes, the consistency checker 202 is arranged to identify any of the references 110 in the corresponding instance files 107 that may thus have become inconsistent. In the present embodiment, the consistency checker 202 is arranged to either correct such references 110 automatically, or identify them to a user via the user interface 203. In order to perform such tasks, the consistency checker 202 utilizes sets of metadata 206, scope data 207 and rules 208 as described in further detail below.

The metadata 206 is created by the dependency manager 201 for each source object 108 and added to the source data store 204. In addition, the dependency manager 201 creates revised metadata 206 for a given source object when modification of the source object 108 is detected. In the present embodiment, the metadata comprises a set of terms or keywords extracted directly from the relevant source object 108. The metadata 206 is user editable via the user interface 203, which also enables a user to define elements of metadata 206. The metadata 206 is extracted in dependence on the type of the relevant source object 108. In the present embodiment, a default set of metadata elements is defined for the common types of object that are inserted as set out below:

Documents—keywords and repeated concepts;
Spreadsheets—title, column titles, tab titles;
Graphs—title, axis names;
Pie charts—title, name of chart areas; and
Pictures—title, caption.

The scope data 207 is the area within the instance file 107 within which the consistency checker 202 checks for references 110 that may have become inconsistent with an updated object instance 109. In other words, the scope data defines, for each instance file 107, the target area for the consistency checker 202. In the present embodiment, the default scope 207 is one paragraph before and after the point of insertion of the object instance 109. The user may define other scopes 207 via the interface 203. For example, other possible scopes include chapter, next two or more paragraphs or chapters or the whole document.

The rules 208 are used by the consistency checker 202 when checking for identifying references 110 that have become inconsistent with an updated object instance 109. In the present embodiment, the consistency checker 202 is arranged to compare the original metadata 206 for a given original object instance 109 with the metadata 206 for the modified version for the object instance 109 and identify the elements of the metadata that have changed. The consistency checker 202 then searches the instance file 107 in accordance with the relevant defined scope 207 to identify references 110 that have become inconsistent. In the present embodiment, the rules 208 determine that the consistency checker 202 searches for references 110 that are exact matches or synonyms of the original metadata elements. Any such identified references 110 are automatically corrected or, in accordance with user preferences, presented as a list of proposed references for correction by individual or bulk approval by the user.

For example, given a source object 108 in the form of a graph from a source file 106 in the form of a spreadsheet entitled "Population Growth in Europe" with axes labeled "Millions of People" and "Years" inserted as an object instance 109 into an instance file 107 in the form of a word processing document. The metadata 206 generated from the graph would be as follows:

population, growth, Europe, millions of people and years.

If the graph is later modified and renamed "Population Decline in Europe", the consistency checker 202 detects the modification of the metadata element "growth" to "decline" and searches the scope 207 in the form of the surrounding paragraphs of the word processing document for the use of the old metadata element "growth" and highlights it for user attention suggesting a change to the term "decline". In addition, the thesaurus function may add synonyms such as "enlargement", "development", or "increase" where applicable as further terms that may need correction for inconsistency with the updated graph. The suggested modification, arranged to remedy the identified inconsistencies, may be performed automatically or manually in accordance with user preferences so as to update the references 110 in the word processing document to reflect the modifications to the included graph.

Figure 3:
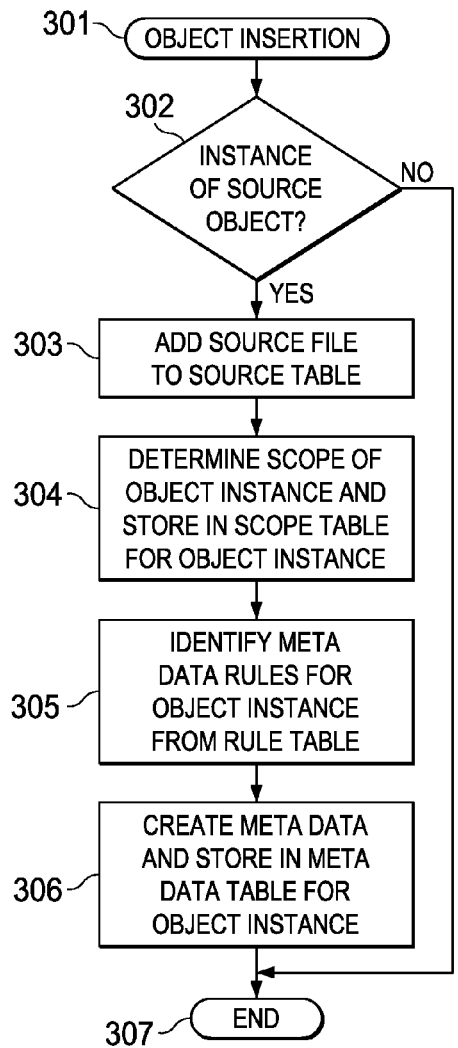
FIGS. 3 to 5 are flow charts illustrating in accordance with an embodiment of the invention processing performed by the plug-in program of FIG. 2.

The processing performed by the dependency manager 201 in response to the inclusion of a new object instance 109 in an instance file 107 will now be described further with reference to the flow chart of FIG. 3. At step 301, processing is initiated in response to the insertion of an object instance 109 into an instance file 107 and processing moves to step 302. At step 302, the user is queried via the user interface 203 as to whether the inserted object instance is one that should be monitored for consistency by the CM 111, and if the user indicates that this is the case processing moves to step 303. At step 303, data identifying the source file 106 is added to the source data 204 and processing moves to step 304. At step 304, the scope data 207 for the new object instance 109 is determined by the user either as the current default for the CM 111 or a selected alternative, and processing moves to step 305. At step 305, the rules 208 governing the identification of metadata 206 for the new object instance 109 are determined by the user either as the current default for the CM 111 or a selected alternative, and processing moves to step 306. At step 306, the metadata 206 for the new object instance 109 is generated from the defined scope 207 of the instance file 107 in accordance with the defined rules 208 and then stored as the original metadata 206 for the object instance 109. Processing then moves to step 307 and ends. If at step 302, the inserted object is not to be monitored by the CM 111, then processing moves directly to step 307 and ends.

Figure 4:
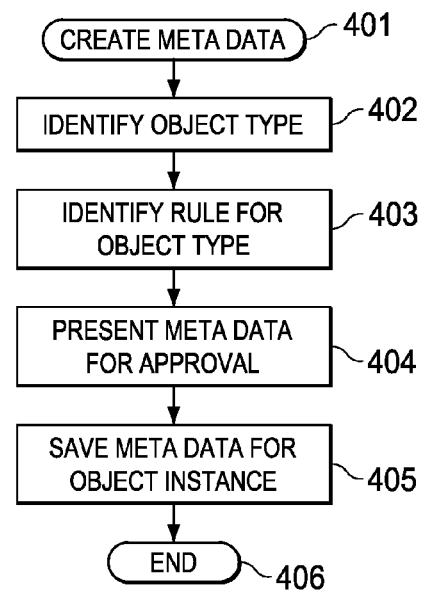

The processing performed by the dependency manager 201 when creating either original or updated metadata 206 will now be described in further with reference to the flow chart of FIG. 4. At step 401, processing is initiated by the dependency manager or by the consistency checker 202 as described below with reference to FIG. 5 and processing then moves to step 402. At step 402, the type of the object instance is identified and processing moves to step 403. At step 403, the metadata 206 for the relevant object instance 109 is generated and processing moves to step 404. At step 404, the metadata 206 is presented to the user for approval or editing and processing then moves to step 405. At step 405, the approved metadata 206 is saved and processing moves to step 406 and ends.

Figure 5:
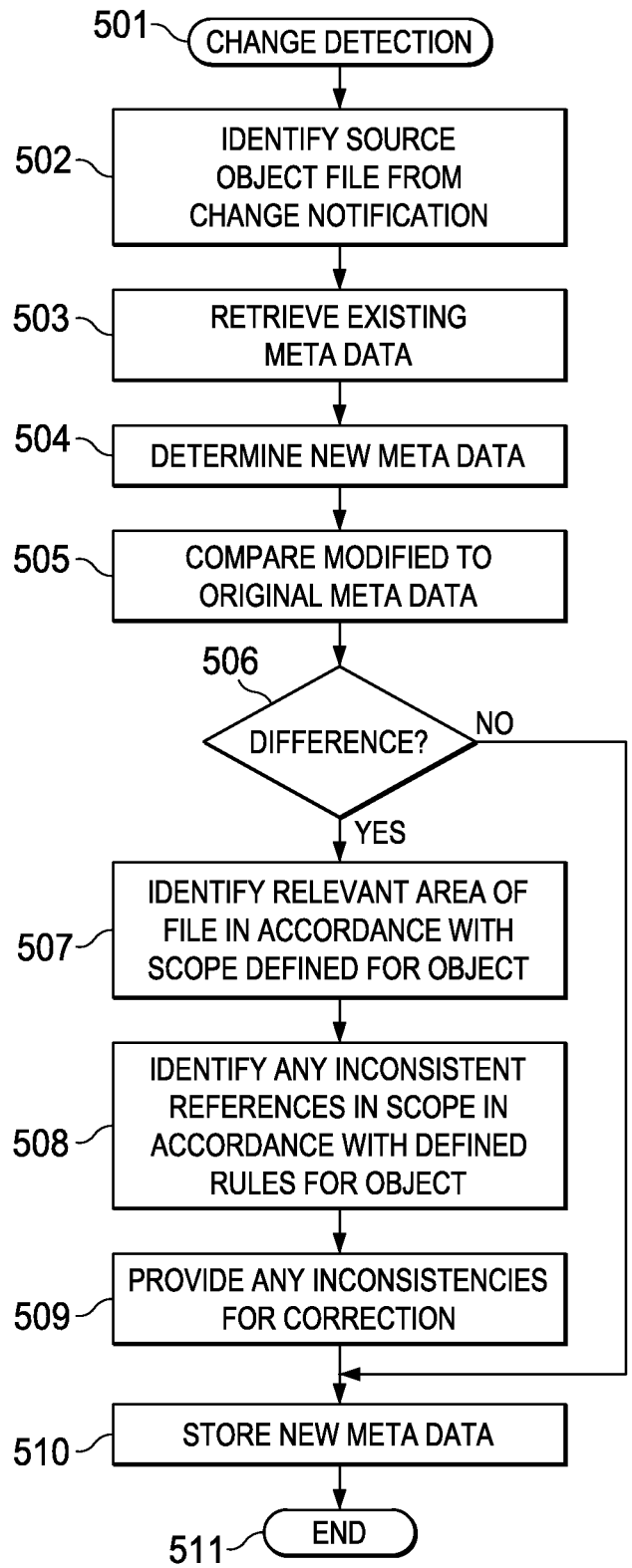

The processing performed by the consistency checker 202 when change in a monitored source object 108 is detected will now be described in further detail with reference to the flow chart of FIG. 5. Processing is initiated at step 501 in response to the detection of a change to a monitored source object 108 and processing moves to step 502. At step 502, each relevant object instance 109 is identified from the change notification and processing moves to step 503. At step 503, the original metadata 206 for the object instance 109 is retrieved and processing moves to step 504. At step 504, updated metadata 206 for the modified object instance 109 is generated and processing moves to step 505. At step 505, the original and modified metadata 206 are compared to identify any changes in the modified metadata 206 and processing moves to step 506. At step 506, if one or more differences are identified in the modified metadata then processing moves to step 507. At step 507, the relevant scope 207 for the modified object instance 109 is identified and processing moves to step 508. At step 508, the relevant rules 208 for the modified object instance 109 and the original metadata elements that have been modified are used together to identify the references 110 within the scope 207 that are inconsistent with the modified metadata 206 and processing moves to step 509. At step 509, the identified inconsistent references are presented to the user via the interface 203 along with suggested changes based on the modified metadata 206 for approval or manual correction and processing moves to step 510. At step 510 the modified metadata 206 is stored as the now original metadata and processing moves to step 511 and ends. If at step 506 no differences are identified between the original and modified metadata 206 then processing moves straight to step 511 and ends.

In another embodiment, the computation of the scope or area of interest uses additional information from the object instance document or application program. For example, if the scope includes one or more cross-references to other parts of the document or other documents that may be identified in the internal data structure for that document or application, the consistency manager may be arranged to include such cross-referenced areas within the scope for a given object instance. In other words, the scope may be distributed within a document or among a group of documents.

As will be understood by those skilled in the art, the consistency manager as described herein may be applied to other types of files and objects that comprise soft dependencies such as software files and objects in the form of software constructs.

In a further embodiment, the source object may be internal to the given instance file. In other words, the source and instance files are within the same file. In another embodiment, unambiguous inconsistencies are corrected automatically with only ambiguous corrections presented to user for decision. In a further embodiment, the same metadata, rules and scope are assigned globally for all files and objects in the given system. In another embodiment, the same metadata, rules and scope are applied to a given set of source and instance object, thus enabling different such sets to have different metadata, rules and scope. In a further embodiment, metadata, rules and scope are assigned to given pairings of source and instance objects, thus enabling different such pairs to have different metadata, rules and scope.

As will be understood by those skilled in the art, the manner in which source objects or files may be monitored for change depends on the given application of the consistency manager. For example, the source file could be monitored for change or the source object itself could be monitored.

As will be understood by those skilled in the art, the consistency manager may be arranged as an ancillary program such as a plug-in program as described above, as operating system functionality or as a stand-alone application or utility program. Embodiments of the invention may be employed in single or multi-user environments. When employed in multi-user environments, the consistency manager as described herein may be coupled to a version control system.

As will be understood by those skilled in the art, the metadata may take various forms, depending of the application, for example, a list of keywords or a set of names or value pairs. The metadata may have qualitative elements associated with it. For example, selected keywords may be assigned a greater importance in the consistency management process. The level of importance of a given keyword may be determined by the directness of its reference or its proximity to the relevant object instance. The metadata may be directly read from the source, for example, for a chart, the text in the legend, title, axis titles or for a diagram the labels used and title. The metadata may be computed, for example, the gradient of a graph, the relative proportions of the parts in a pie chart or relative position of two bars in a chart for competitive analysis. In other words, the metadata may be arranged to represent as much of the semantic content of a given source object as possible so as to enable the identification of more references to that object in a given file or group of files.

In another embodiment, the rules applied for checking consistencies, that is, for identifying inconsistent references in a given instance file, comprise rules that search for antonyms. These rules may be provided in addition or instead of the rules described above, such as the rules defining searches for exact matches or synonyms. Further rules may be arranged to apply a function or use weighting to identify references. For example, a high weighting may be given to surrounding information, direct cross-references, or matches of the title.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the scope of applicant's general inventive concept.

What is claimed is:

1. A method for maintaining consistency between a data object and references in a file referring to the data object, the method comprising the steps of:
    receiving an indication that the data object has changed;
    identifying a change made to the data object;
    analyzing the file comprising one or more references referring to the data object to identify those of the references that are inconsistent with the change made to the data object;
    comparing a first set of metadata associated with the data object prior to the change with a second set of metadata associated with the data object after the change;
    responsive to determining one or more differences between the first and second sets of metadata, searching the file for one or more occurrences of a first metadata element that differs from the second set of metadata; and
    identifying any matches to the first metadata element in the file, the matches comprising the references that are inconsistent with the change made to the data object.

2. A method according to claim 1 in which one or more of the matches comprising the references that are inconsistent with the change made to the data object are corrected automatically in dependence on a corresponding second metadata element.

3. A method according to claim 1 in which the first and second sets of metadata are compared in response to detection of a change in a monitored source object.

4. A method according to claim 1 in which the first and second sets of metadata are generated in dependence on a type of the object, wherein the type of the data object is at least one of a document, spreadsheet, graph, chart and picture.

5. A method according to claim 1 in which the matches comprise references that are synonyms of one of the differing first metadata elements.

6. An apparatus for maintaining consistency between a data object and references in a file referring to the data object, the apparatus comprising:
    a data processor coupled to a memory and operable for executing instructions in the memory to perform steps of:
    receiving an indication that a data object has changed;
    identifying one or more of the changes made to the data object;
    analyzing the file comprising one or more references referring to the data object to identify those of the references that are inconsistent with the change made to the data object;
    compare a first set of metadata associated with the data object prior to the change with a second set of metadata associated with the data object after the change;
    responsive to determining one or more differences between the first and second sets of metadata, search the file for one or more occurrences of a first metadata element that differs from the second set of metadata; and
    identify any matches to the first metadata element in the file, the matches comprising the references that are inconsistent with the change made to the data object.

7. The apparatus according to claim 6 in which one or more of the matches comprising the references that are inconsistent with the change made to the data object are corrected automatically in dependence on a corresponding second metadata element.

8. The apparatus according to claim 6 in which the first and second sets of metadata are compared in response to the detection of a change in a monitored source object.

9. The apparatus according to claim 6 in which the first and second sets of metadata are generated in dependence on a type of the object, wherein the type of the data object is at least one of a document, spreadsheet, graph, chart and picture.

10. The apparatus according to claim 6 in which the matches comprise references that are synonyms of one of the differing first metadata elements.

* * * * *